Patented Sept. 30, 1952

2,612,513

UNITED STATES PATENT OFFICE 2,612,513

PREPARATION OF DIESTERS OF ALIPHATIC OXOPHOSPHONIC ACIDS

Earl W. Gluesenkamp, Centerville, and Tracy M. Patrick, Jr., Dayton, Ohio, assignors to Monsanto Chemical Company, St. Louis, Mo., a corporation of Delaware No Drawing. Application August 25, 1950, Serial No. 181,574

17 Claims. (Cl. 260—461)

The present invention relates to organic phosphorus compounds, provides an improved process of preparing aliphatic oxo-phosphonates, and also provides some new and highly useful compounds which are prepared by said process.

We have found that diesters of aliphatic oxophosphonic acids may be readily prepared by contacting a diester of phosphorous acid with an $\alpha,\beta$-unsaturated aliphatic ketone in the presence of a free-radical liberating agent. The reaction is one of simple addition in which a mole of the di-ester adds to at least one $\alpha,\beta$-olefinic double bond of the ketone. It appears to be general for all diesters of phosphorous acid and for all aliphatic $\alpha,\beta$-unsaturated ketones, but it is of special importance in connection with the preparation of hydrocarbon di-esters of aliphatic, saturated or mono-olefinic oxo-phosphonic acids, the reaction in this case proceeding substantially according to the scheme

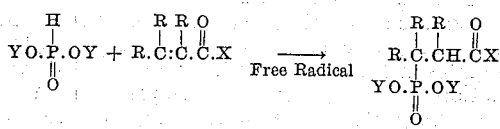

in which Y is a hydrocarbon residue, R is selected from the class consisting of hydrogen and alkyl radicals and X is selected from the class consisting of alkyl and alkenyl radicals. The preferred phosphites, i. e., phosphites with which the addition reaction proceeds easily and smoothly without substantial formation of by-products are those in which Y is selected from the class consisting of alkyl, cycloalkyl, aryl, alkaryl and aralkyl radicals of from 1 to 12 carbon atoms. The preferred ketones are those in which R is selected from the class consisting of hydrogen and alkyl radicals of from 1 to 8 carbon atoms and X is selected from the class consisting of alkyl radicals of from 1 to 8 carbon atoms and alkenyl radicals of from 4 to 8 carbon atoms.

One class of ketones which may be employed in the present process comprises alkyl alkenyl ketones, the reaction with such ketones proceeding substantially as follows:

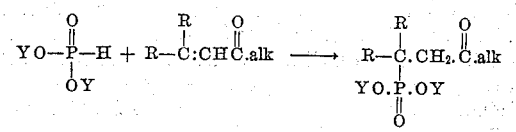

in which Y is selected from the class consisting of alkyl, cycloalkyl, aryl, aralkyl and alkaryl radicals of from 1 to 12 carbon atoms; R is selected from the class consisting of hydrogen and alkyl radicals of from 1 to 8 carbon atoms and alk denotes an alkyl radical of from 1 to 8 carbon atoms. As illustrative of ketones having the above structure and useful for the present purpose may be mentioned the alkyl vinyl ketones including methyl, ethyl, propyl or isobutyl vinyl ketone, mesityl oxide and other higher alkyl ketones having an olefinic double bond conjugated with the carbonyl group, e. g., ethylideneacetone, $CH_3CH:CH.CO.CH_3$, isobutylideneacetone $(CH_3)_2CH.CH:CH.CO.CH_3$ isoamylideneacetone $(CH_3)_2CH.CH_2CH:CH.CO.CH_3$ 3-methyl-3-hepten-5-one $CH_3.CH_2.C(CH_3):CH.CO.CH_2CH_3$ 3-decen-2-one $CH_3(CH_2)_5.CH:CH.CO.CH_3$, 2,3,6-trimethyl-3-hepten-5-one $(CH_3)_2CH.C(CH_3):CH.CO.CH(CH_3)_2$ and 6-methyl-6-tridecen-8-one $CH_3(CH_2)_4C(CH_3):CH.CO.(CH_2)_4CH_3$ Addition of the phosphite occurs at the double bond, the product obtained with mesityl oxide and diethylphosphite, for example, being diethyl 2-methyl-4-oxo-pentane-2-phosphonate

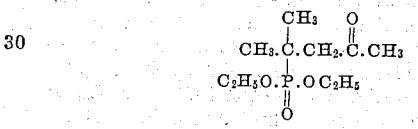

Another class of ketones which may be employed in the present process comprises dialkenyl ketones, the reaction with such ketones proceeding substantially according to the scheme:

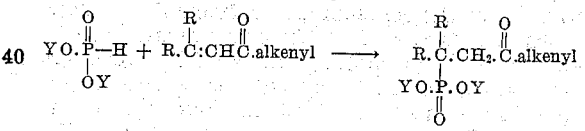

in which Y and R are defined above and alkenyl denotes an alkenyl radical of from 2 to 8 carbon atoms. As illustrated of dialkenyl ketones useful for the present purpose may be mentioned phorone $(CH_3)_2C:CH.CO.CH:C(CH_3)_2$, homophorone $CH_3.CH_2.C(CH_3):CH.CO.C$
$(CH_3):C(CH_3).CH_2.CH_3$ and 3,6,7-trimethyl-3,6-nonadien-5-one $CH_3.CH_2.C(CH_3):CH.CO.C$
$(CH_3):C(CH_3).CH_2CH_3$ Addition of the dialkyl or diaryl phosphite generally takes place with the formation of a 1:1 ketone-phosphite adduct, e. g., phorone generally reacts as follows:

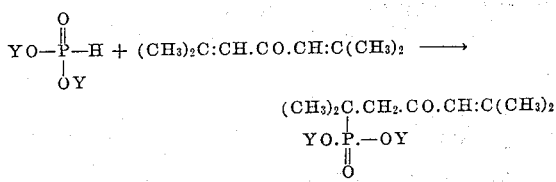

Under some conditions, however, phorone, as well as other of the present dialkenyl ketones may react with the formation of 1:2 ketone-phosphite adducts, addition of the phosphite taking place at each of the double bonds. The formation of either the 1:1 or the 1:2 adducts depends upon the nature of the individual ketone and phosphite used, as well as upon the reaction conditions employed.

Phosphites useful for the present purpose are dialkyl, dicycloalkyl, diaryl, dialkaryl or diaralkyl phosphites generally, and preferably those in which each alkyl, aryl, cycloalkyl, aralkyl or alkaryl radical has from 1 to 12 carbon atoms, e. g., dimethyl, diethyl, diisopropyl, di-n-butyl, di-tert.-amyl, dicyclohexyl, di-n-hexyl, bis (2-ethylhexyl), di-dodecyl, diphenyl, dibenzyl, di-cresyl, di-$\beta$-naphthyl or dixenyl phosphite.

The addition reaction with mesityl oxide or with phorone, both readily available $\alpha,\beta$-unsaturated ketones, proceeds especially easily, addition of di-esters of phosphorous acid to these ketones generally resulting in the formation of the corresponding addition products in good yields, say, in yields of at least 50%, based on the ketonic constituent.

Free-radical liberating agents which may be employed in promoting addition of the above phosphites to the olefinic ketones are compounds which will decompose to give free radicals. Such compounds include peroxygen-type catalysts, for example acyl peroxides such as acetyl, benzoyl, lauroyl or stearoyl peroxides; hydrocarbon peroxides or hydroperoxides such as di-tert.-butyl peroxide, di-tert.-amyl peroxide, tert.-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of a free-radical liberating agent need be employed in promoting the addition reaction. Quantities of as little as 0.001 per cent to 1.0 per cent, based on the weight of the ketone, are generally sufficient to give optimum yields of the oxo-phosphonates. In order to avoid detrimental side reactions, quantities of more than 5 per cent of the catalyst, based on the weight of the ketonic component, should not be employed. Ultra-violet light may be employed with the catalyst or as the sole catalytic agent.

The addition reaction may be effected simply by contacting the phosphite with the olefinic ketone in the presence of a free-radical liberating agent such as a peroxidic compound at ordinary or increased temperature, depending upon the nature of the individual reactants employed. Optimum yields are generally obtained by maintaining the mixture of reactants and catalyst at a temperature which allows steady decomposition of the catalyst.

For the formation of the mono-phosphonates, one mole of the phosphite may be employed with one mole of the olefinic ketone. Advantageously however, in order to avoid the formation of telomeric products, the phosphite is used in excess. Optimum yields of the oxo-phosphonates are obtained when employing from 3 moles to 5 moles, and even up to 10 moles, of the phosphite per mole of the olefinic ketone.

When working with the dialkenyl ketones, mono-phosphonates are generally formed; however the formation of diphosphonates, i. e., 1:2 ketone-phosphite adducts, by addition of the phosphite at each olefinic bond of the ketone component may occur, depending upon the reaction conditions employed and the nature of the individual reactants.

The present oxo-phosphonates are stable, rather high-boiling materials which range from viscous liquids to waxy or crystalline solids. They are generally useful for a variety of industrial purposes, for example, as plasticizers for synthetic resins and plastics, as textile lubricants, intermediates for the production of surface-active agents, pharmaceuticals, lubricating oil adjuvants, etc. Particularly valuable as gear lubricant additives are oxo-phosphonates which have the general formula $$\begin{array}{c} \text{CH}_3 \quad \text{O} \\ | \quad\quad \| \\ \text{CH}_3.\text{C}.\text{CH}_2.\text{C}.\text{T}. \\ | \\ \text{ZO}.\text{P}.\text{OZ} \\ \| \\ \text{O} \end{array}$$

in which T is selected from the class consisting of the methyl radical and the isobutenyl radical and Z is an alkyl radical of at least 2, but not more than 8 carbon atoms. Such oxo-phosphonates are readily available by the addition reaction of mesityl oxide or phorone with a dialkyl phosphite in which the alkyl radical has from 2 to 8 carbon atoms.

When these oxo-phosphonates are blended with suitable base oils, there are obtained efficient gear lubricants for all types of automotive differentials and conventional transmissions. The extreme pressure-resisting properties which are imparted to lubricants by these oxo-phosphonates results in the provision of very efficient lubricants for heavy duty industrial gear type units.

This invention is further illustrated, but not limited, by the following examples:

*Example 1*

A mixture consisting of 250 g. (1.81 moles) of diethyl phosphite, 50 g. (0.363 mole) of phorone and 1.0 cc of di-tert.-butyl peroxide is brought to a temperature of 130° C. and maintained at that temperature, for a period of 20 hours. Distillation of the resulting reaction product, employing a 10'' Vigreux column, gave a fraction, B. P. 63° C./2 mm. to 128° C./1 mm., $n_D^{25}$ 1.4605, which upon re-distillation gave the substantially pure diethyl 2,6-dimethyl-4-oxo-5-hepten-2-phosphonate, B. P. 111–114° C. 0.7 mm., $n_D^{25}$ 1.4642,

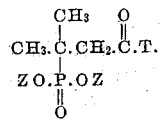

1.0241, and anaylzing 11.35% phosphorus (calcd. P. for $C_{13}H_{25}O_4P$, 11.21%).

Example 2

A mixture consisting of 276 g. (2.0 moles) of diethyl phosphite, 98 g. of mesityl oxide and 3.0 g. of benzoyl peroxide was heated at a temperature of from 85° C. to 87° C. for 24 hours. Distillation of the resulting reaction mixture through a 10″ Vigreux column gave a fraction, B. P. 70° C.–145° C./11 mm., which upon redistillation gave the substantially pure diethyl 2-methyl-4-oxopentane-2-phosphonate B. P. 81–86° C./1 mm., $n_D^{25}$ 1.4462, $d_{25}^{25}$ 1.0296, and analyzing 13.16% phosphorus (calcd. P. for $C_{10}H_{21}O_4P$, 13.11%).

Example 3

A mixture consisting of 276 g. (2.0 moles) of diethyl phosphite, 98 g. (1.0 mole) of mesityl oxide and 2.0 cc. of di-tert.-butyl peroxide was heated at a temperature of about 132° C. After four hours, an additional 1.0-cc. portion of di-tert.-butyl peroxide was added and heating was continued for 15.5 hours longer. The resulting reaction product was distilled to yield a fraction B. P. 43° C./1.3 mm. to 145° C./3 mm. Redistillation of this fraction gave a 54% yield of substantially pure diethyl 2-methyl-4-oxopentane-2-phosphonate.

Example 4

This example shows the preparation of a crude diethyl 2-methyl-4-oxopentane-2-phosphonate which was found to be highly efficient as an extreme pressure-imparting additive to lubricants.

A mixture consisting of 690 g. (5.0 moles) of diethyl phosphite, 245 g. (2.5 moles) of mesityl oxide and 5.0 cc. of di-tert.-butyl peroxide was heated for 19 hours. The temperature at the beginning was about 130° C.; this dropped to 116° C. owing to refluxing before the end of the heating period. Removal of material B. P. ca. 30° C./150 mm. to 78° C./0.8 mm. from the resulting reaction mixture gave as residue 542.4 g. of an amber liquid, $n_D^{25}$ 1.4563, consisting largely of the 1:1 mesityl oxide-diethyl phosphite adduct, i. e., diethyl 2-methyl-4-oxopentane-2-phosphonate.

Evaluation of this crude product as a lubricant additive showed that addition of the product to both solvent and conventionally refined representative (i. e., Pennsylvania, Mid Continent and Coastal) base oils gave lubricants having very good load-carrying capacities at any temperatures likely to be reached in service.

Example 5

A mixture consisting of 12.8 g. (0.152 mole) of ethylidene acetone, 62.9 g. (0.456 mole) of diethyl phosphite and 0.5 cc. of di-tert.-butyl peroxide was heated to a temperature of about 132° C. and maintained at that temperature for about 5 hours. An additional 0.5 cc. of the peroxide was added to the reaction mixture and heating at about 132° C. was continued for an additional 16 hours. Distillation of the resulting reaction product gave the 1:1 ethylideneacetone-diethyl phosphite adduct, probably diethyl 4-oxopentane-2-phosphonate, B. P. 80–85° C./0.8 mm., $n_D^{25}$ 1.4507, $d_{25}^{25}$ 1.0334, and analyzing 13.18% phosphorus (calcd. P for $C_9H_{19}O_4P$, 13.94%).

It is to be understood that the foregoing detailed description is given merely by way of illustration and that many variations may be made therein without departing from the spirit of our invention.

What we claim is:

1. The method of preparing diesters of aliphatic oxophosphonic acids which comprises contacting a diester of phosphorous acid with an $\alpha,\beta$-unsaturated aliphatic ketone in the presence of a free-radical liberating agent.

2. The method of preparing compounds having the general formula

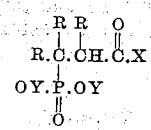

in which R is selected from the class consisting of hydrogen and alkyl radicals, Y is a hydrocarbon residue, and X is selected from the class consisting of alkyl and alkenyl radicals, which comprises contacting, in the presence of a free-radical liberating agent an ester having the general formula

in which Y is a hydrocarbon residue, with a ketone having the general formula

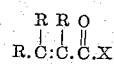

in which R is selected from the class consisting of hydrogen and alkyl radicals and X is selected from the class consisting of alkyl and alkenyl radicals.

3. The method of preparing compounds having the general formula

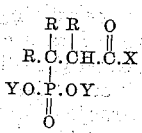

in which R is selected from the class consisting of hydrogen and alkyl radicals of from 1 to 8 carbon atoms, X is selected from the class consisting of alkyl and alkenyl radicals of from 1 to 8 carbon atoms, and Y is selected from the class consisting of alkyl, cycloalkyl, aryl, alkaryl and aralkyl radicals of from 1 to 12 carbon atoms, which comprises contacting, in the presence of a free-radical liberating agent, an ester having the general formula

in which Y is selected from the class consisting of alkyl, cycloalkyl, aryl, alkaryl and aralkyl radicals of from 1 to 12 carbon atoms, and a ketone having the general formula

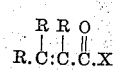

in which R is selected from the class consisting of hydrogen and alkyl radicals of from 1 to 8 carbon atoms and X is selected from the class consisting of alkyl and alkenyl radicals of from 1 to 8 carbon atoms.

4. The method claimed in claim 3 further characterized in that the free-radical liberating agent is a peroxidic compound.

5. The method of preparing compounds having the general formula $$R.\underset{\underset{\overset{\|}{O}}{YO.P.OY}}{\overset{R}{C}}.CH_2.\overset{O}{\overset{\|}{C}}.alk$$

in which Y is selected from the class consisting of alkyl, cycloalkyl, aryl, alkaryl and aralkyl radicals of from 1 to 12 carbon atoms, and alk denotes an alkyl radical of from 1 to 8 carbon atoms, which comprises contacting, in the presence of a free-radical liberating agent, an ester having the general formula $$YO.\underset{\overset{\|}{O}}{\overset{H}{P}}.OY$$

in which Y is selected from the class consisting of alkyl, cycloalkyl, aryl, alkaryl and aralkyl radicals of from 1 to 12 carbon atoms, with a ketone having the general formula $$R.\overset{R}{\overset{|}{C}}:\overset{H}{\overset{|}{C}}.\overset{O}{\overset{\|}{C}}.alk$$

in which R is selected from the class consisting of hydrogen and alkyl radicals of from 1 to 8 carbon atoms and alk denotes an alkyl radical of from 1 to 8 carbon atoms.

6. The method of preparing compounds having the general formula $$R.\underset{\underset{\overset{\|}{O}}{YO.P.OY}}{\overset{R}{\overset{|}{C}}}.CH_2.\overset{O}{\overset{\|}{C}}.alkenyl$$

in which Y is selected from the class consisting of alkyl, cycloalkyl, aryl, alkaryl and aralkyl radicals of from 1 to 12 carbon atoms, R is selected from the class consisting of hydrogen and alkyl radicals of from 1 to 8 carbon atoms, and alkenyl denotes an alkenyl radical of from 2 to 8 carbon atoms, which comprises contacting, in the presence of a free-radical liberating agent, an ester having the general formula $$YO.\underset{\overset{\|}{O}}{\overset{H}{P}}.OY$$

in which Y is selected from the class consisting of alkyl, cycloalkyl, aryl, alkaryl and aralkyl radicals of from 1 to 12 carbon atoms, with a ketone having the general formula $$R.\overset{R}{\overset{|}{C}}:\overset{H}{\overset{|}{C}}.\overset{O}{\overset{\|}{C}}.alkenyl$$

in which R is selected from the class consisting of hydrogen and alkyl radicals of from 1 to 8 carbon atoms and alkenyl denotes an alkenyl radical of from 2 to 8 carbon atoms.

7. The method of preparing ketophosphonates having the general formula $$CH_3-\overset{X}{\overset{|}{C}}-CH_2-\overset{O}{\overset{\|}{C}}-T$$
$$ZO-\underset{\overset{\|}{O}}{P}-OZ$$

in which Z is an alkyl radical of from 1 to 8 carbon atoms, X is selected from the class consisting of hydrogen and the methyl radical and T is selected from the class consisting of the methyl and the isobutenyl radical, which comprises contacting, in the presence of a free-radical liberating agent, a dialkyl phosphate in which each alkyl radical has from 1 to 8 carbon atoms with a ketone selected from the class consisting of mesityl oxide, phorone and ethylidenacetone, and recovering said ketophosphonate from the resulting reaction product.

8. The method of preparing dialkyl 2-methyl-4-oxopentane-2-phosphonates in which each alkyl radical has from 1 to 12 carbon atoms which comprises contacting mesityl oxide, in the presence of a free-radical liberating agent, with a dialkyl phosphite in which each alkyl radical has from 1 to 12 carbon atoms.

9. The method of preparing dialkyl 2,6-dimethyl - 4 - oxo - 5 - hepten - 2 - phosphonates in which each alkyl radical has from 1 to 12 carbon atoms which comprises contacting phorone, in the presence of a free-radical liberating agent, with a dialkyl phosphite in which each alkyl radical has from 1 to 12 carbon atoms.

10. The method of preparing dialkyl 4-oxopentane - 2 - phosphonate which comprises contacting ethylidenacetone, in the presence of a free-radical liberating agent, with a dialkyl phosphite in which each alkyl radical has from 1 to 12 carbon atoms.

11. The method of preparing diethyl 2-methyl-4-oxopentane-2-phosphonate which comprises contacting mesityl oxide with diethyl phosphite in the presence of a free-radical liberating agent.

12. The method of preparing diethyl 2,6-dimethyl - 4 - oxo - 5 - hepten - 2 - phosphonate which comprises contacting phorone with diethyl phosphite in the presence of a free-radical liberating agent.

13. The method of preparing diethyl 4-oxopentane - 2 - phosphonate which comprises contacting ethylideneacetone with diethyl phosphite in the presence of a free-radical liberating agent.

14. Ketophosphonates having the general formula $$CH_3-\overset{X}{\overset{|}{C}}-CH_2-\overset{O}{\overset{\|}{C}}-T$$
$$ZO-\underset{\overset{\|}{O}}{P}-OZ$$

in which Z is an alkyl radical of from 1 to 8 carbon atoms, X is selected from the class consisting of hydrogen and the methyl radical and T is selected from the class consisting of the methyl and the isobutenyl radical.

15. Diethyl 2,6 - dimethyl - 4 - oxo - 5 - hepten-2-phosphonate.

16. Diethyl 2 - methyl - 4 - oxopentane - 2 - phosphonate.

17. Diethyl 4-oxopentane-2-phosphonate.

EARL W. GLUESENKAMP.
TRACY M. PATRICK, Jr.

REFERENCES CITED

The following references are of record in the file of this patent:

UNITED STATES PATENTS

| Number | Name | Date |
|---|---|---|
| 2,478,390 | Hanford et al. | Aug. 9, 1949 |
| 2,492,994 | Harman et al. | Jan. 3, 1950 |

OTHER REFERENCES

Arbusov et al., J. Gen. Chem. (U.S.S.R.) vol. 4, pp. 834–41 (1934) as abstracted in Chem. Abstracts, vol. 29, columns 2145–2146 (1935).

Drake et al., J. Org. Chem., vol. 2, pp. 387–396 (1938).